April 19, 1960     J. C. McFALL ET AL     2,933,390
SUPERSENSITIZATION OF PHOTOGRAPHIC SILVER HALIDE EMULSIONS
Filed Oct. 12, 1955

*Fig. 1*

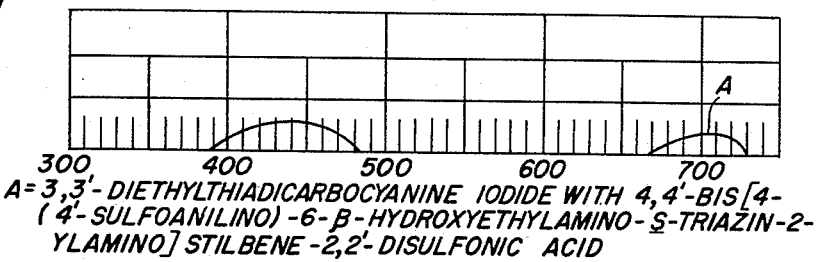

A = 3,3'- DIETHYLTHIADICARBOCYANINE IODIDE WITH 4,4'-BIS[4-(4'-SULFOANILINO)-6-β-HYDROXYETHYLAMINO-S-TRIAZIN-2-YLAMINO] STILBENE-2,2'-DISULFONIC ACID

*Fig. 2*

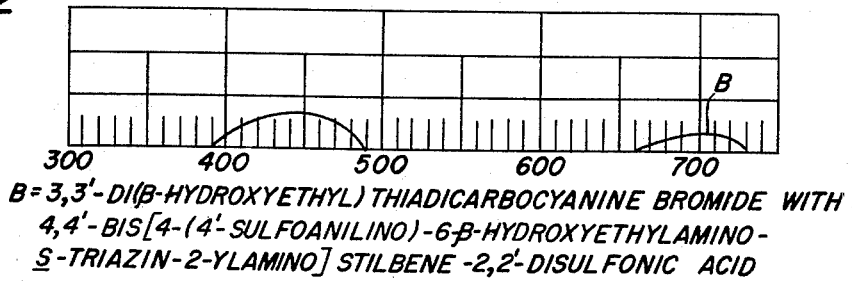

B = 3,3'- DI(β-HYDROXYETHYL) THIADICARBOCYANINE BROMIDE WITH 4,4'- BIS[4-(4'-SULFOANILINO)-6-β-HYDROXYETHYLAMINO-S-TRIAZIN-2-YLAMINO] STILBENE-2,2'-DISULFONIC ACID

*Fig. 3*

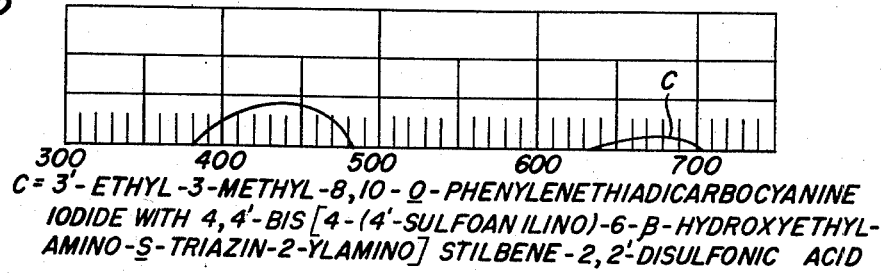

C = 3'- ETHYL-3-METHYL-8,10-O-PHENYLENETHIADICARBOCYANINE IODIDE WITH 4,4'- BIS[4-(4'-SULFOANILINO)-6-β-HYDROXYETHYL-AMINO-S-TRIAZIN-2-YLAMINO] STILBENE-2,2'-DISULFONIC ACID

JOHN C. McFALL
PAUL R. CROOKSHANK
INVENTORS

BY *Daniel J. Mayne*
*Lawrence H. Willis*

ATTORNEYS

United States Patent Office 2,933,390
Patented Apr. 19, 1960

2,933,390

SUPERSENSITIZATION OF PHOTOGRAPHIC SILVER HALIDE EMULSIONS

John C. McFall and Paul R. Crookshank, Rochester, N.Y., assignors to Eastman Kodak Company, Rochester, N.Y., a corporation of New Jersey Application October 12, 1955, Serial No. 540,001

12 Claims. (Cl. 96—100)

This invention relates to photographic silver halide emulsions containing thiadicarbocyanine dyes, and as supersensitizers therefor, bis-triazinylaminostilbene compounds.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

We have now found another means of altering the sensitivity in emulsions containing thiadicarbocyanine dyes. Since the conditions in the emulsion, i.e., the hydrogen ion and/or the silver ion concentration undergo little or no change in our method, we shall designate our method as a kind of supersensitization.

It is, therefore, an object of our invention to provide photographic emulsions containing thiadicarbocyanine dyes and, as supersensitizers therefor, bis-triazinylaminostilbene compounds. Another object is to provide a process for preparing these supersensitized emulsions. Still another object is to provide photographic emulsions containing thiadicarbocyanine dyes and bis-triazinylaminostilbene compounds which are especially useful in color photography. Other objects will become apparent from a consideration of the following description and examples.

By thiadicarbocyanine dyes we mean dicarbocyanine dyes which contain two benzothiazole nuclei. These dyes can be unsubstituted on the carbocyclic rings, or on the polymethine chain, or they can be so substituted by alkyl groups (such as methyl, ethyl, etc.) alkoxyl groups (such as methoxyl, ethoxyl, etc.), aryloxyl groups (such as phenoxyl, chlorophenoxyl, etc.), arylene groups (e.g., phenylene, naphthylene, etc.) and like groups. Particularly useful dyes comprise those represented by the following general formula:

(I)
$$R-N\overset{X}{=\!=\!=}C-CH=CH-CH=CH-CH=C\overset{Z_1}{-\!-\!-}R_1$$
$$\underset{X}{|}$$

wherein R and $R_1$ each represents an alkyl group (such as methyl, ethyl, β-hydroxyethyl, carboxymetyl, β-carboxyethyl, carbomethoxymethyl, carbethoxymethyl, etc. X represents an acid radical (such as chloride, bromide, iodide, perchlorate, thiocyanate, p-toluene-sulfonate, benzenesulfonate, methylsulfate, ethylsulfate, etc.), and Z and $Z_1$ each represents the non-metallic atoms necessary to complete a heterocyclic nucleus of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethoxybenzothiazole, 5,6-dioxymethylenebenzothiazole, 5-hydroxybenzothiazole, 6-hydroxybenzothiazole, etc.).

The bis-triazinylaminostilbene compounds useful in practicing our invention have been previously employed in the art as fluorescent agents and as bleaching (optical) agents, and hence are widely known substances. Especially useful compounds of this class comprise those compounds represented by the following general formula:

(II) 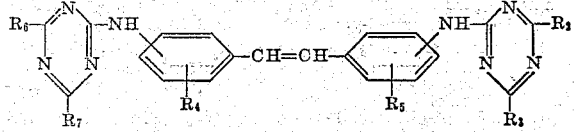

wherein $R_6$, $R_7$, $R_2$, and $R_3$ each represents a hydrogen atom, or a substitutent group, such as hydroxyl, aryloxyl (e.g., phenoxyl, o-toloxyl, p-sulfophenoxyl, etc.), alkoxyl (e.g., methoxyl, ethoxyl, etc.), a halogen atom (e.g., chlorine, bromine, etc.), a heterocyclic radical (e.g., morpholinyl, piperidyl, etc.), an alkylthio group (e.g., methylthio, ethylthio, etc.), an arylthio group (e.g., phenylthio, tolylthio, etc.), a heterocyclylthio group (e.g., benzothiazylthio, etc.), an amino group, an alkylamino group (e.g., methylamino, ethylamino, propylamino, dimethylamino, diethylamino, dodecylamino, cyclahexylamino, β-hydroxyethylamino, di-β-hydroxyethylamino, β-sulfoethylamino, etc.), an arylamino group (e.g., anilino, o-, m-, and p-sulfoanilino, o-, m-, and p-chloroanilino, o-, m-, and p-anisylamino, o-, m-, and p-toludino, o-, m-, and p-carboxyanilino, hydroxyanilino, sulfonaphthylamino, o-, m-, and p-aminoanilino, p-acetamidoanilino, etc.), etc., and $R_4$ and $R_5$ each represents a hydrogen atom or a water-solubilizing group, such as sulfo, carboxyl, etc. (as well as alkali metal or amine salts of such groups). Many of the compounds represented by Formula II above are known substances, and methods for preparing these compounds are well known. Listed below are representative compounds selected from those represented by Formula II, although our invention is not limited in any sense to these particular compounds. While the structural formulas are included for only the first three compounds, it is to be understood that the same numbering system is employed throughout the specification.

(1) 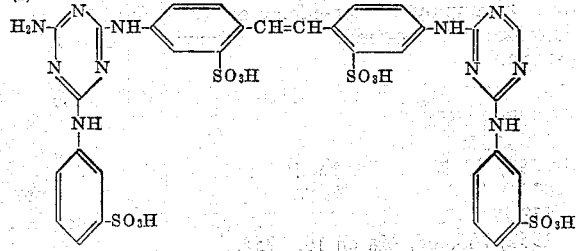

4,4'-bis[4-(3'-sulfoanilino)-6-amino-s-triazin-2-ylamino]-stilbene-2,2'-disulfonic acid (2)

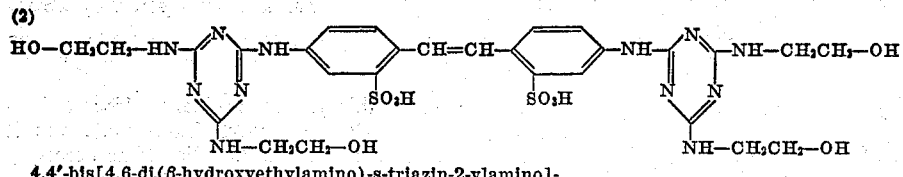

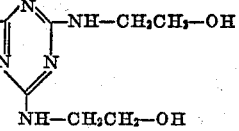

4,4′-bis[4,6-di(β-hydroxyethylamino)-s-triazin-2-ylamino]-stilbene-2,2′-disulfonic acid (3)

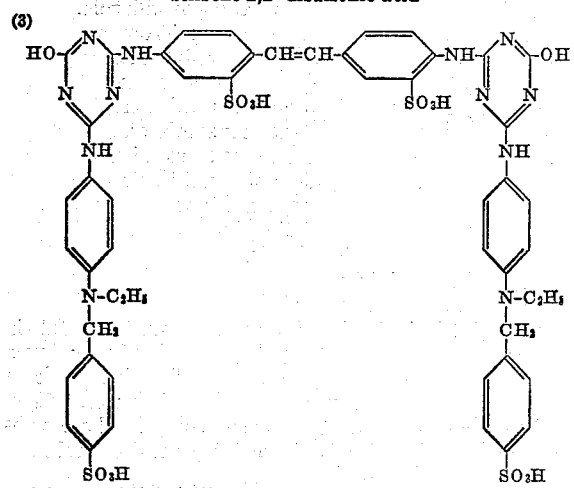

4,4′-bis{4-[4′-(N′-4″-sulfobenzyl-N′-ethyl)aminoanilino]-6-hydroxy-s-triazin-2-ylamino}stilbene-2,2′-disulfonic acid (4) 4,4′-bis[4-(4′-sulfoanilino)-6-β-hydroxyethylamino-s-triazin-2-ylamino]stilbene-2,2′-disulfonic acid
(5) 4,4′-bis[4,6-dianilino-s-triazinyl-2-ylamino]stilbene-2,2′-disulfonic acid
(6) 4,4′-bis[4-phenoxy-6-(β-hydroxyethylamino)-s-triazin-2-ylamino]stilbene-2,2′-disulfonic acid
(7) 4,4′-bis(4,6-dianilino-s-triazin-2-ylamino)stilbene
(8) 4,4′-bis(4,6-dihydroxy-s-triazin-2-ylamino)stilbene-2,2′-disulfonic acid
(9) 4,4′-bis(4-anilino-6-hydroxy-s-triazin-2-ylamino)stilbene-2,2′-disulfonic acid
(10) 4,4′-bis[4-(2′-chloroanilino)-6-hydroxy-s-triazin-2-ylamino]stilbene-2,2′-disulfonic acid
(11) 4,4′-bis[4-(5′-sulfonaphthylamino)-6-hydroxy-s-triazin-2-ylamino]stilbene-2,2′-disulfonic acid
(12) 4,4′-bis[4-n-dodecylamino-6-(β-sulfoethylamino)-s-triazin-2-ylamino]stilbene-2,2′-disulfonic acid
(13) 4,4′-bis[4-N-morpholinyl-6-(4′-sulfoanilino)-s-triazin-2-ylamino]stilbene-2,2′-disulfonic acid
(14) 4,4′-bis[4,6-di(N-morpholinyl)-s-triazin-2-ylamino]stilbene-2,2′-disulfonic acid
(15) 4,4-bis-{4-[4′-(5″-keto-3″-methyl-2″-pyrazolin-1″-yl)-anilino]-6-hydroxy-s-triazin-2-ylamino}stilbene-2,2′-disulfonic acid
(16) 4-[4-ethylamino-6-(di-β-hydroxyethyl)amino-s-triazin-2-ylamino]-4′-[4-methylamino-6-(β-hydroxyethylamino)-s-triazin-2-ylamino]stilbene-2,2′-disulfonic acid
(17) 4-[4-methylamino-6-(β-hydroxyethylamino)-s-triazin-2-ylamino]-4′-[4-ethylamino-6-(2′-anisidino)-s-triazin-2-ylamino]stilbene-2,2′-disulfonic acid
(18) 4-[4-ethylamino-6-(β-hydroxyethylamino)-s-triazin-2-yl-amino]-4′-[4,6-diamino-s-triazin-2-ylamino]stilbene-2,2′-disulfonic acid
(19) 4,4′-bis[4-chloro-6-di(β-hydroxyethyl)amino-s-triazin-2-ylamino]stilbene-2,2′-disulfonic acid
(20) 4,4′-bis[4-anilino-6-(β-hydroxyethylamino)-s-triazin-2-ylamino]stilbene-2,2′-disulfonic acid
(21) 4,4′-bis[4-(4′-acetamidoanilino)-6-(β-hydroxyethylamino)-s-triazin-2-ylamino]stilbene-2,2′-disulfonic acid
(22) 4,4′-bis[4-amino-6-(3′-carboxyphenylamino)-s-triazin-2-ylamino]stilbene-2,2′-disulfonic acid
(23) 4-[4-phenoxy-6-(β-hydroxyethylamino)-s-triazin-2-ylamino]-4′-[4-chloro-6-di(β-hydroxyethyl)amino-s-triazin-2-ylamino]stilbene-2,2′-disulfonic acid
(24) 4,4′-bis[4-ethylthio-6-(β-hydroxyethylamino)-s-triazin-2-ylamino]stilbene-2,2′-disulfonic acid
(25) 4,4′-bis[4-phenylthio-6-(β-hydroxyethylamino)-s-triazin-2-ylamino]stilbene-2,2′-disulfonic acid
(26) 4,4′-bis(s-triazin-2-ylamino)stilbene-2,2′-disulfonic acid Compounds of the above type which can advantageously be employed in practicing our invention have been described in one or more of the following representative patents:

U.S. 2,171,427, August 29, 1939; 2,473,475, June 14, 1949; 2,595,030, April 29, 1952; 2,660,578, November 24, 1953;

Br. 595,065, November 26, 1947; 623,849, May 24, 1949; 624,051, May 26, 1949; 624,052, May 26, 1949; 678,291, September 3, 1952; 681,642, October 29, 1952; 705,406, March 10, 1954.

These products have been previously employed in the textile field, and are sold under such trade names as Leucophor B, Calcofluor White MR, Tinopal (SP, WR, BV277, 2B, GS, NG), Blancofor SC, Hiltamine (BSP, N, Sol., 6T6), and the like.

According to our invention, we incorporate one or more of the thiadicarbocyanine dyes represented by Formula I above with one or more s-triazinylaminostilbene compounds, such as those represented by Formula II above. Our invention is particularly directed to the ordinarily employed gelatino-silver-halide emulsions. However, our supersensitizing combinations can be employed in silver halide emulsions in which the carrier is other than gelatin, e.g., a resinuous substance or cellulosic material which has no deteriorating effect on the light-sensitive materials. The thiadicarbocyanine dyes and s-triazinylaminostilbene compounds can be employed in various concentrations depending upon the effects desired.

Ordinarily, the optimum or near optimum concentration of the thiadicarbocyanine dyes which we employ in practicing our invention is of the order of from 0.010 to 0.30 g. per mol. of silver halide in the emulsion.

The s-triazinylaminostilbene compounds which we employ in our invention can advantageously be employed at a concentration of from about 0.03 to 10.0 g. per mol. of silver halide in the emulsion.

In general, the ratio of concentration of thiadicarbocyanine dye to s-triazinylaminostilbene compound can vary rather widely in our combinations, e.g., from 1:1 to 1:300 (by weight) in many cases.

The methods of incorporating sensitizing dyes in silver halide emulsions are well known to those skilled in the art. The s-triazinylaminostilbene compounds can be directly dispersed in the emulsions, or they can be dissolved in water (or an organic solvent, such as methanol, ethanol, etc., where the water-solubility is not sufficiently great) and added in the form of their solutions. While the thiadicarbocyanine dyes can be directly dispersed in the emulsions, it is convenient to add the same in the form of solutions in appropriate solvents. Methanol, ethanol, pyridine, and the like have proven satisfactory for many of the dyes of Formula I. Mixtures of solvents, e.g., pyridine diluted with methanol or acetone, can also be used. The thiadicarbocyanine dyes and s-triazinylaminostilbene compounds are dispersed in the finished emulsions and should be uniformly distributed throughout the emulsions. The following procedure is satisfactory: Stock solutions of the thiadicarbocyanine dyes and stilbene compounds are prepared by dissolving the same in appropriate solvents as described above. Then, to the flowable gelatino-silver-halide emulsion, the desired amounts of the stock solution of one of the dyes (or stilbene compounds) are slowly added, while stirring the emulsion. Stirring is continued until the dye is thoroughly incorporated in the emulsion. Then the desired amount of the stock solution of the stilbene compound (or dye, if stilbene compound has been added first) is slowly added to the emulsion, while stirring. Stirring is continued until the second solution is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art. The foregoing procedures and proportions are to be regarded only as illustrative. Clearly, our invention is directed to any silver halide emulsion containing a combination of the aforesaid thiadicarbocyanine dyes and s-triazinylaminostilbene compounds whereby a supersentitizing effect is obtained.

The following examples will serve to illustrate further the manner of practicing our invention.

In Table I below, to different portions of the same batch of photographic gelatino-silver-halide emulsion were added (1) a thiadicarbocyanine dye, such as those represented by Formula I above, and (2) a combination of the thiadicarbocyanine dye and a bis(s-triazin-2-ylamino)stilbene (in neutral aqueous solution). Then the emulsions were held at about 40° C. for a short time and coated on a support, chill set, and dried. After exposure through a Wratten No. 25 filter, i.e., a filter which transmits substantially no light of wavelength shorter than about 580 mu, in an Eastman Type IB sensitometer, the film strips were processed for 3 minutes in a developer having the following composition:

| | g. |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |

Water to make 1 liter.

The speed (red), gamma and fog for each of the coatings was then measured. The results are recorded in Table I.

triazin-2-ylamino]stilbene-2,2'-disulfonic acid. The sensitometric measurements are given in Example 3 of the above table.

In Figure 2, curve B represents the sensitivity of an ordinary gelatino-silver-bromiodide emulsion sensitized with 3,3'-di($\beta$-hydroxyethyl)thiadicarbocyanine bromide and 4,4'-bis[4-(4'-sulfoanilino)-6-($\beta$-hydroxyethylamino)-s-triazin-2-ylamino]stilbene-2,2'-disulfonic acid. The sensitometric measurements are given in Example 4 of the above table.

In Figure 3, curve C represents the sensitivity of an ordinary gelatino-silver-bromiodide emulsion sensitized with 3'-ethyl-3 - methyl-8,10-o-phenylenethiadicarbocyanine iodide and 4,4'-bis[4-(4'-sulfoanilino)-6-($\beta$-hydroxyethylamino)-s-triazin-2-ylamino] - stilbene-2,2'-disulfonic acid. The sensitometric measurements are given in Example 5 in the above table.

Our invention is primarily directed to the ordinarily employed gelatino-silver-halide developing-out emulsions, e.g., gelatino-silver-chloride, -chlorobromide, -chloroiodide, -chlorobromiodide, -bromide and -bromiodide developing-out emulsions. Emulsions which form the latent image mostly inside the silver halide grains, such as the emulsions set forth in U.S. Patent 2,456,956, dated December 21, 1948, can also be employed in practicing our invention.

The emulsions prepared in accordance with our invention can be coated in the usual manner on any suitable support, e.g., glass, cellulose nitrate film, cellulose acetate film, polyvinylacetal resin film, paper or metal.

TABLE I

| Example | Sensitizing Dye and Addenda (g./mol. AgX) | Red Light Exposure | | |
|---|---|---|---|---|
| | | 30/E Speed | Gamma | Fog |
| 1 | (a) 3,3'diethylthiadicarbocyanine iodide (.075) | 18 | 3.3 | .17 |
| | (b) dye (a) (.075) plus Calcofluor White MR* (.13) | 32 | 1.9 | .15 |
| 2 | (c) 3,3'-di($\beta$-hydroxyethyl)thiadicarbocyanine bromide (.075) | 16 | 4.1 | .09 |
| | (d) dye (c) (.075) plus Calcofluor White MR* (.13) | 26 | 2.6 | .10 |
| 3 | (e) dye (a) (.050) | 4.6 | 0.9 | .06 |
| | (f) dye (a) (.050) plus compound 4 (3.0) | 13.7 | 2.7 | .06 |
| 4 | (g) dye (c) (.050) | 7.6 | 2.4 | .06 |
| | (h) dye (c) (.050) plus compound 4 (3.0) | 14.4 | 3.0 | .06 |
| 5 | (i) 3'-ethyl-3-methyl-8,10-o-phenylenethiadicarbocyanine iodide (.050) | no. sens. | | .05 |
| | (j) dye (i) (.050) plus compound 4 (3.0) | 5.6 | 1.6 | .05 |
| 6 | (k) dye (a) (.050) | 2.8 | 0.48 | .06 |
| | (l) dye (a) (.050) plus Calcofluor White MR* (3.0) | 25.5 | 2.3 | .06 |
| 7 | (m) dye (c) (.050) | 8.65 | 2.3 | .06 |
| | (n) dye (c) (.050) plus Calcofluor White MR* (3.0) | 14.7 | 2.4 | .07 |
| 8 | (o) dye (i) (.050) | .51 | 1.8 | .06 |
| | (p) dye (i) (.050) plus Calcofluor White MR* (3.0) | 2.8 | 1.8 | .07 |

* Calcofluor White MR is a bis(s-triazin-2-ylamino)stilbene-2,2'-disulfonic acid (sodium salt).

In the above table, the coatings of Examples 1 and 2 were made from the same batch of gelatino-silver-chlorobromide emulsion, the coatings of Examples 3, 4 and 5 were made from the same batch of gelatino-silver-bromiodide emulsion, the coatings of Example 6 were made from the same batch of gelatino-silver-bromiodide emulsion, and the coatings of Examples 7 and 8 were made from the same batch of gelatino-silver-bromiodide emulsion.

The accompanying drawing illustrates the supersensitizing effect obtained with three of our new combinations in gelatino-silver-bromiodide emulsions. Each figure of the drawing is a diagrammatic reproduction of one spectrogram. The sensitivity of the emulsion containing both the thiadicarbocyanine dye and the bis(s-triazin-2-ylamino)stilbene compound is represented by the solid curve. No curve for the emulsions containing the thiadicarbocyanine dyes alone has been shown, since these dyes sensitized too weakly to give satisfactory spectrograms.

In Figure 1, curve A represents the sensitivity of an ordinary gelatino-silver-bromiodide emulsion sensitized with 3,3'-diethylthiadicarbocyanine iodide and 4,4'-bis[4-(4' - sulfoanilino) - 6 - ($\beta$ - hydroxyethylamino) - s -

Photographic silver halide emulsions, such as those listed above, containing the supersensitizing combinations of our invention can also contain such addenda as chemical sensitizers, e.g., sulfur sensitizers (e.g., allyl thiocarbamide, thiourea, allylisothiocyanate, cystine, etc), various gold compounds (e.g., potassium chloroaurate, auric trichloride, etc.) (see U.S. Patents 2,540,085; 2,597,856 and 2,597,915), various palladium compounds, such as palladium chloride (U.S. 2,540,086), potassium chloropalladate (U.S. 2,598,079), etc., or mixtures of such sensitizers; antifoggants, such as ammonium chloroplatinate (U.S. 2,566,245), ammonium chloroplatinite (U.S. 2,566,263), benzotriazole, nitrobenzimidazole, 5-nitroindazole, benzidine, mercaptans, etc. (see Mees—"The Theory of the Photographic Process," Macmillan Pub., page 460), or mixtures thereof; hardeners, such as formaldehyde (U.S. 1,763,533), chrome alum (U.S. 1,763,533), glyoxal (U.S. 1,870,354), dibromacrolein (Br. 406,750), etc.; color couplers, such as those described in U.S. Patent 2,423,730, Spence and Carroll U.S. Patent 2,640,766, etc.; or mixtures of such addenda. Dispersing agents for color couplers, such as those set forth in U.S. Patents 2,322,027 and 2,304,940, can also be employed in the above-described emulsions.

Such silver halide emulsions can also contain thiazolidone or other ultraviolet absorbing compounds, such as those described in the copending application Serial No. 419,239, filed March 29, 1954, in the name of G. W. Sawdey, now U.S. Patent 2,739,888, issued March 27, 1956. While certain emulsion addenda, such as certain ultraviolet compounds, and certain color-forming compounds cause de-sensitization or un-sensitizing effects, it has been found that the new combinations of our invention largely overcome such effects. Typical color-forming compounds which can be so employed include those in U.S. Patent 2,322,027 and the following:

Coupler:

(1) 1 - hydroxy - 2 - [δ-(2',4'-di-tert.amylphenoxy)-n-butyl]-naphthamide (U.S. Patent 2,474,293)
(2) 1 - hydroxy - 4-phenylazo-4'-(p-tert.-butylphenoxy)-2-naphthanilide (U.S. Patent 2,521,908)
(3) 2-(2,4-di-tert.amylphenoxyacetamino) - 4,6-dichloro-5-methyl phenol (Graham U.S. application Serial No. 285,544, now U.S. Patent 2,725,291)
(4) 2 - (α-2,4-di-tert.amylphenoxy-n-butyrylamino)-4,6-dichloro-5-methyl phenol
(5) 6 - {α{4-[α-(2,4-di-tert.amylphenoxy)butyramido]-phenoxy}acetamido}-2,4-dichloro-3-methyl phenol
(6) 2 - [3'-(2'',4''-diamylphenoxy) - acetamido]-benzamido-4-chloro-5-methyl phenol tino chlorobromide emulsion, and in certain coatings, (4) a thiazolidone ultraviolet absorbing compound, such as 5 - benzal - 3 - n - cetyl - 2 - phenylimino-4-thiazolidone, in the amounts shown in the table and/or a bis(s-triazin-2-ylamino)stilbene compound, such as Leucophor B (a bis(s-triazin-2-ylamino)stilbene-2,2'-disulfonic acid), in the amounts shown in the table. In addition to this cyan layer, the coatings had a magneta layer (green sensitive) containing an incorporated color-forming compound of the type shown in U.S. Patent 2,600,788 mentioned above and a yellow layer (blue sensitive) containing an incorporated color-forming compound of the type shown in McCrossen et al. U.S. application Ser. No. 476,159, filed December 20, 1954, now abandoned. The coatings were then exposed and developed in the usual manner. The speed (log E, 0.6 above fog) and gamma (contrast) of the cyan layer was measured in addition to the cyan, magenta and yellow dye loss after 10 days exposure to radiation containing ultraviolet radiation. Print-out density for the exposed coatings was also measured after 10 days. The results are given in the following table. While the U.V. absorbing compound protected the cyan, magenta and yellow dye layers against dye loss (fading), it caused a rather severe loss in speed. On the other hand, the stilbene compound more than restored this loss in speed without adversely affecting the stabilizing effect of the U.V. compound.

TABLE II

| Example | U.V. Compound, mg./sq. ft. | Stilbene Comp., mg./sq. ft. | Red Log E Speed | Gamma | 10 Day Print-Out Density | Cyan Dye Loss (10 days) | Magenta Dye Loss (10 days) | Yellow Dye Loss (10 days) |
|---|---|---|---|---|---|---|---|---|
| 9 (a) | 0 | 0 | 0.60 | 1.51 | +.23 | −.32 | −.46 | −.56 |
| (b) | 157 | 0 | 0.26 | nil | +.12 | −.27 | −.22 | −.28 |
| (c) | 157 | 5 | 0.78 | 1.58 | +.07 | −.10 | −.12 | −.25 |
| (d) | 157 | 15 | 0.82 | 1.45 | +.06 | −.22 | −.18 | −.25 |
| (e) | 157 | 25 | 0.89 | 1.54 | +.05 | −.26 | −.18 | −.25 |
| 10 (f) | 0 | 0 | 0.53 | 1.38 | +.20 | −.24 | −.44 | −.72 |
| (g) | 0 | 65 | 0.99 | 1.31 | +.12 | −.22 | −.35 | −.46 |
| (h) | 25 | 65 | 0.94 | 1.44 | +.04 | −.18 | −.22 | −.24 |
| (i) | 50 | 65 | 0.91 | 1.49 | +.04 | −.19 | −.25 | −.23 |
| (j) | 157 | 30 | 0.71 | 1.46 | +.01 | −.17 | −.22 | −.19 |
| 11 (k) | 157 | 0 | 0.37 | nil | +.06 | −.15 | −.34 | −.28 |
| (l) | 157 | 1 | 0.79 | 1.41 | +.06 | −.20 | −.15 | −.26 |
| (m) | 157 | 2 | 0.85 | 1.41 | +.06 | −.12 | −.15 | −.26 |
| (n) | 157 | 4 | 0.94 | 1.50 | +.08 | −.18 | −.15 | −.30 |

Leucophor B is a bis(s-triazin-2-ylamino)stilbene-2,2'-disulfonic acid (sodium salt).

(7) 1 - (2',4',6' - trichlorophenyl) - 3 - [3''-(2''',4'''-di-tert.amylphenoxyacetamido)-benzamido] - 5 - pyrazolone (U.S. Patent 2,600,788)
(8) 1 - (2',4',6' - trichlorophenyl) - 3-[3''-(2''',4'''-di-tert.-amylphenoxyacetamido) - benzamido] - 4 - (p-methoxyphenylazo)-5-pyrazolone
(9) N - (4-benzoylacetaminobenzenesulfonyl) - N - (γ-phenylpropyl)-p-toluidine (U.S. Patent 2,298,443)
(10) α - o - Methoxybenzoyl-α-chloro-4-[α-(2,4-di-tert.-amylphenoxy)-n-butyramido]-acetanilide (McCrossen U.S. application Serial No. 295,806, now U.S. Patent 2,728,658, issued December 27, 1955)
(11) α - {3 - [α-(2,4-di-tert.amylphenoxy)acetamido]-benzoyl}-2-methoxyacetanilide
(12) 3 - benzoylacetamido - 4 - methoxy-2',4'-di-tert. amylphenoxy acetanilide
(13) 4 - benzoylacetamido - 3 - methoxy-2',4'-di-tert. amylphenoxy acetanilide The following table and examples will serve to illustrate the beneficial effects of our new supersensitizing combinations when employed in multilayer photographic emulsion layers containing incorporated color-forming compounds. In Table II below these beneficial effects are illustrated with respect to a multilayer color element having an outermost cyan layer (red sensitive) containing (1) a coupler dispersion of a color-forming compound, such as coupler No. 5 above, (2) a red sensitizing dye, such as 3,3'-diethylthiadicarbocyanine iodide, (3) a gela- While separate emulsion batches were employed in Examples 9, 10 and 11 above, the same emulsion batches were employed for the coatings of a given example for purposes of comparison. The word "nil" as used in the table means too low to be significant, or not measurable.

The following examples will serve to illustrate further the beneficial effects of our new combinations in photographic silver halide emulsions.

*Example 12*

A washed gelatino-chlorobromide emulsion sensitized with .035 g./mol. of silver halide of 3,3'-di(β-hydroxyethyl)thiadicarbocyanine bromide was coated both with and without the addition of 52 g./mol. of silver halide of a bis(s-triazin-2-ylamino)stilbene-2,2'disulfonic acid (Leucophor B). Both coatings after exposure were developed in the usual manner to form a silver image. The coating containing the stilbene compound was 0.12 log E units higher in blue speed and 0.26 log E units higher in red speed than the coating which did not contain the stilbene compound.

*Example 13*

A washed gelatino-chlorobromide emulsion sensitized with .035 g./mol. of silver halide of 3,3'-di(β-hydroxyethyl)thiadicarbocyanine bromide was coated both with and without the addition of 52 g./mol. of silver halide of a bis(s-triazin-2-ylamino)stilbene-2,2'-disulfonic acid (Leucophor B). Both coatings contained a dispersion of a dye coupler, such as coupler No. 9 above, and after exposure the coatings were developed in the usual manner, then bleached to give a dye image. The coating containing the stilbene compound was .05 log E units higher in blue speed and .18 log E units higher in red speed than the coating which did not contain the stilbene compound.

*Example 14*

A washed gelatino-chlorobromide emulsion sensitized with .031 g./mol. of silver halide of 3,3'-di($\beta$-hydroxyethyl)thiadicarbocyanine bromide was coated both with and without the addition of 5 g./mol. of silver halide of a bis(s-triazin-2-ylamino)stilbene-2,2'-disulfonic acid (Leucophor B). Both coatings contained a dispersion of a dye coupler, such as coupler No. 9 above, and the coatings were developed in the usual manner, then bleached to give a dye image. The coating containing the stilbene compound was .16 log E units higher in blue speed and .34 log E units higher in red speed than the coating which did not contain the stilbene compound.

*Example 15*

An unwashed gelatino-chlorobromide emulsion sensitized with .039 g./mol. of silver halide of 3,3'-di($\beta$-hydroxyethyl)thiadicarbocyanine bromide was coated both with and without the addition of 26 g. of a bis(s-triazin-2-ylamino)stilbene-2,2'-disulfonic acid (Leucophor B). Both coatings contained a dispersion of dye coupler, such as coupler No. 9 above, and after exposure were developed in the usual manner in a black and white developer, reexposed, and subjected to color development, bleaching and fixing to produce a dye image. The coating containing the stilbene compound was .37 log E units higher in red speed than that which did not contain the stilbene compound.

*Example 16*

A washed gelatino-chlorobromide emulsion sensitized with .0385 g./mol. of silver halide of 3,3'-di($\beta$-hydroxyethyl)thiadicarbocyanine bromide was coated both with and without the addition of 5 g./mol. of a bis(s-triazin-2-ylamino)stilbene-2,2'-disulfonic acid (Leucophor B). Both coatings contained a dye coupler dispersion, such as coupler No. 9 above, and after exposure were developed in the usual manner in a color developer and bleached to give a dye image. The coating containing the stilbene compound was .12 log E units higher in blue speed and .12 log E units higher in red speed than the coating containing no stilbene compound.

By bis(s-triazin-2-ylamino)stilbene compound, we mean a compound of the following structure:

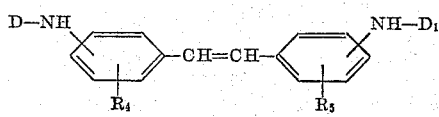

wherein $R_4$ and $R_5$ each have the values given above, and D and $D_1$ each represents a s-triazin-2-yl nucleus.

The thiadicarbocyanine dyes of Formula I comprise a well known class of optical sensitizing dyes. Methods for making these dyes have been previously described in the prior art. See, for example, U.S. Patent 2,213,238, issued September 3, 1940; U.S. Patent 2,231,658, issued February 11, 1941; U.S. Patent 2,265,909, issued December 9, 1941; U.S. Patent 2,269,234, issued January 6, 1942; and British Patent 562,567, accepted July 6, 1944. Dye (i) in Table I was made as described in U.S. Patent 2,265,909 and was obtained as dark blue needles melting at 191-2° C. dec.

As mentioned above, many of the compounds represented by Formula II above have been described in the prior art. Examples of preparing such compounds are given in the copending application Serial No. 540,054, filed on even date herewith in the names of B. H. Carroll, J. E. Jones and J. Spence.

In Table I above, no data for the emulsions containing the stilbene compound alone are given, since it has been found from numerous coatings that such compounds when used alone have little or no sensitometric effect on the emulsions.

The compounds of Formula II also showed marked antistaining properties in many instances, and also antifoggant properties in certain instances, in addition to their supersensitizing and anti-unsensitizing effects. We have also found that compounds represented by Formula II above, wherein $R_2$, $R_3$, $R_6$ and/or $R_7$ represent a heterocyclylamino group (e.g., 2-benzothiazylamino, 2-pyridylamino, etc.) can advantageously be employed in practicing our invention. For the preparation of such compounds, see the process described in the copending application of Carroll, Jones and Spence Serial No. 540,052, filed on even date herewith.

The disulfonic acids of Formula II are generally employed in neutral aqueous solution as mentioned above, i.e., the free acids are at least partially neutralized with sodium hydroxide, potassium hydroxide, sodium carbonate, ammonia, triethylamine, etc. before use in the emulsions. The corresponding disulfonic acid salts result. It is thus possible to adjust the pH of these aqueous solutions so that they are about the same as the pH of the emulsions.

What we claim as our invention and desire secured by Letters Patent of the United States is:

1. A photographic silver halide emulsion sensitized with a supersensitizing combination of at least one cyanine dye selected from the class represented by the following general formula:

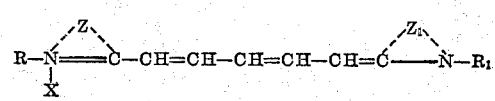

wherein R and $R_1$ each represents an alkyl group containing from 1 to 4 carbon atoms, X represents an acid radical, and Z and $Z_1$ each represents the non-metallic atoms necessary to complete a heterocyclic nucleus of the benzothiazole series, and at least one bis(s-triazin-2-ylamino)stilbene compound selected from the class represented by the following general formula:

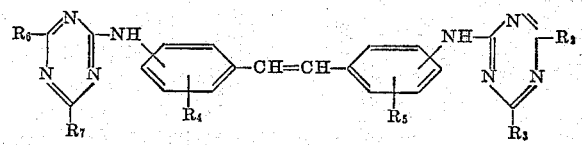

wherein $R_2$, $R_3$, $R_6$ and $R_7$ each represents a member selected from the group consisting of a hydrogen atom, a hydroxyl group, an aryloxyl group, an alkoxyl group, a halogen atom, a heterocyclic radical, an alkylthio group, an arylthio group, and an amino group, and $R_4$ and $R_5$ each represents a member selected from the group consisting of a hydrogen atom and a sulfo group.

2. A photographic gelatino-silver-halide developing-out emulsion sensitized with a supersensitizing combination of at least one thiadicarbocyanine dye selected from the class represented by the following general formula:

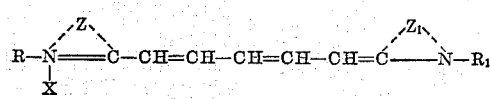

wherein R and $R_1$ each represents an alkyl group containing from 1 to 2 carbon atoms, and Z and $Z_1$ each represents the non-metallic atoms necessary to complete a heterocyclic nucleus of the benzothiazole series, and at least one bis(s-triazine-2-ylamino)stilbene compound selected from the class represented by the following general formula:

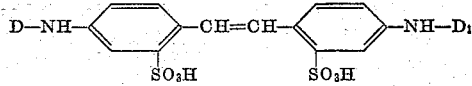

wherein D and $D_1$ each represents a s-triazin-2-yl nucleus.

3. A photographic gelatino-silver-bromiodide developing-out emulsion sensitized with a supersensitizing combination of at least one thiadicarbocyanine dye selected from the class represented by the following general formula:

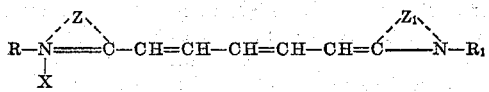

Wherein R and $R_1$ each represents an alkyl group containing from 1 to 2 carbon atoms, X represents an acid radical, and Z and $Z_1$ each represents the non-metallic atoms necessary to complete a heterocyclic nucleus of the benzothiazole series, and at least one bis(s-triazin-2-ylamino) stilbene compound selected from the class represented by the following general formula:

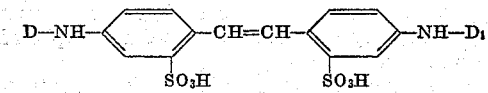

wherein D and $D_1$ each represents a s-triazin-2-yl nucleus.

4. A photographic gelatino-silver-chlorobromide developing-out emulsion sensitized with a supersensitizing combination of at least one thiadicarbocyanine dye selected from the class represented by the following general formula:

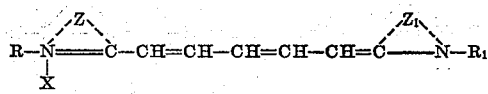

Wherein R and $R_1$ each represents an alkyl group containing from 1 to 2 carbon atoms, X represents an acid radical, and Z and $Z_1$ each represents the non-metallic atoms necessary to complete a heterocyclic nucleus of the benzothiazole series, and at least one bis(s-triazin-2-ylamino)stilbene compound selected from the class represented by the following general formula:

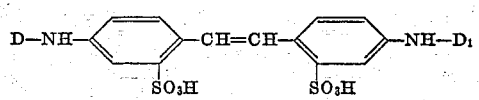

wherein D and $D_1$ each represents a s-triazin-2-yl nucleus.

5. A photographic gelatino-silver-halide developing-out emulsion sensitized with a supersensitizing combination of a 3,3'-diethylthiadicarbocyanine salt and at least one bis(s-triazin-2-ylamino)stilbene compound selected from the class represented by the following general formula:

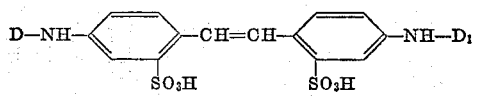

wherein D and $D_1$ each represents a s-triazin-2-yl nucleus.

6. A photographic gelatino-silver-halide developing-out emulsion sensitized with a supersensitizing combination of a 3,3-di($\beta$-hydroxyethyl)thiadicarbocyanine salt and at least one bis(s-triazin-2-ylamino)stilbene compound selected from the class represented by the following general formula:

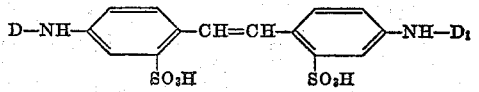

wherein D and $D_1$ each represents a s-triazin-2-yl nucleus.

7. A photographic gelatino-silver-halide developing-out emulsion sensitized with a supersensitizing combination of a 3'-ethyl-3-methyl-8,10-o-phenylenethiadicarbocyanine salt and at least one bis(s-triazin-2-ylamino)stilbene compound selected from the class represented by the following general formula:

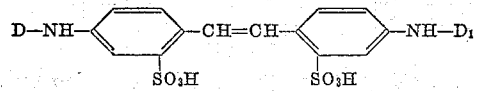

wherein D and $D_1$ each represents a s-triazin-2-yl nucleus.

8. A photographic gelatino-silver-halide developing-out emulsion sensitized with a supersensitizing combination of 3,3'-diethylthiadicarbocyanine iodide and 4,4'-bis[4-(4' - sulfoanilino) - 6 - ($\beta$ - hydroxyethylamino) - s - triazin-2-ylamino]stilbene-2,2'-disulfonic acid.

9. A photographic gelatino-silver-halide developing-out emulsion sensitized with a supersensitizing combination of 3,3'-di($\beta$-hydroxyethyl)thiadicarbocyanine bromide and 4,4'-bis[4-(4'-sulfoanilino) - 6($\beta$ - hydroxyethylamino)-s-triazin-2-ylamino]stilbene-2,2'-disulfonic acid.

10. A photographic gelatino-silver-halide developing-out emulsion sensitized with a supersensitizing combination of 3'-ethyl-3-methyl-8,10-o-phenylenethiadicarbocyanine iodide and 4,4'-bis[4-(4'-sulfoanilino)-6-($\beta$-hydroxyethylamino) - s - triazin - 2 - ylamino]stilbene 2,2' - disulfonic acid.

11. A photographic silver halide developing-out emulsion capable of producing a dye image comprising a gelatino-silver-halide developing-out emulsion containing (1) a dispersion of a phenol, color-forming compound capable of reacting with a primary aromatic amine developing agent to form a cyan dye image, (2) a thiadicarbocyanine dye selected from the class represented by the following general formula:

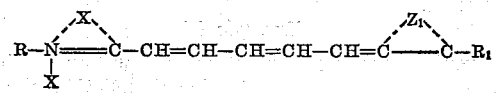

wherein R and $R_1$ each represents an alkyl group containing from 1 to 4 carbon atoms, X represents an acid radical, and Z and $Z_1$ each represents the non-metallic atoms necessary to complete a heterocyclic nucleus of the benzothiazole series, and (3) a bis(s-triazin-2-ylamino)stilbene compound selected from the class represented by the following general formula:

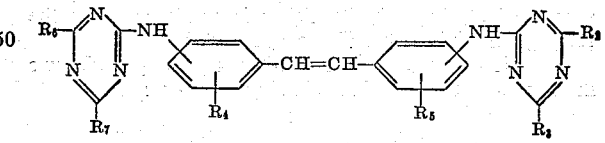

wherein $R_2$, $R_3$, $R_6$ and $R_7$ each represents a member selected from the group consisting of a hydrogen atom, a hydroxyl group, an aryloxyl group, an alkoxyl group, a halogen atom, a heterocyclic radical, an alkylthio group, an arylthio group, and an amino group, and $R_4$ and $R_5$ each represents a member selected from the group consisting of a hydrogen atom and a sulfo group.

12. A photographic silver halide developing-out emulsion capable of producing a dye image comprising a gelatino-silver-halide developing-out emulsion containing (1) a dispersion of a phenol, color-forming compound capable of reacting with a primary aromatic amine developing agent to form a cyan dye image, (2) a thiadicarbocyanine dye selected from the class represented by the following general formula:

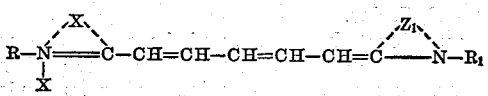

wherein R and $R_1$ each represents an alkyl group containing from 1 to 4 carbon atoms, X represents an acid radical, and Z and $Z_1$ each represents the non-metallic atoms necessary to complete a heterocyclic nucleus of the benzothiazole series, and (3) a bis(s-triazin-2-ylamino)stilbene compound selected from the class represented by the following general formula:

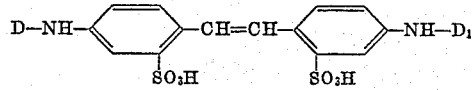

wherein D and $D_1$ each represents a s-triazin-2-yl nucleus.

References Cited in the file of this patent

UNITED STATES PATENTS

| | | |
|---|---|---|
| 2,367,551 | Yule | Jan. 16, 1945 |
| 2,476,536 | Dersch | July 19, 1949 |
| 2,718,466 | Wolfson | Sept. 20, 1955 |

FOREIGN PATENTS

| | | |
|---|---|---|
| 675,656 | Great Britain | July 16, 1952 |

OTHER REFERENCES

Mees: "The Theory of the Photographic Process," Macmillan Co., N.Y. (1954), page 365.

UNITED STATES PATENT OFFICE

Certificate of Correction

Patent No. 2,933,390

April 19, 1960

John C. McFall et al.

It is hereby certified that error appears in the printed specification of the above numbered patent requiring correction and that the said Letters Patent should read as corrected below.

Column 1, lines 65 to 68, Formula (I) should appear as shown below instead of as in the patent:

column 2, lines 61 to 66, the upper right-hand portion of Formula (I) should appear as shown below instead of as in the patent:

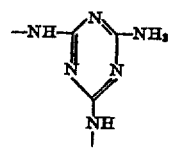

column 3, line 45, compound (15), for "4,4-bis-" read —4,4'-bis- —; column 10, line 72, after "atoms," insert —X represents an acid radical,—; column 12, lines 37 to 40, and lines 71 to 74, the formula in each occurrence should appear as shown below instead of as in the patent:

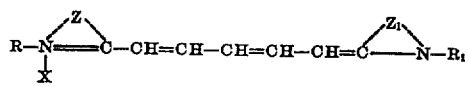

Signed and sealed this 22nd day of November 1960.

[SEAL]

Attest:
KARL H. AXLINE,
*Attesting Officer.*

ROBERT C. WATSON,
*Commissioner of Patents.*